United States Patent [19]

Banba et al.

[11] 4,417,130
[45] Nov. 22, 1983

[54] TRANSISTOR TYPE PULSE WELDING DEVICE

[75] Inventors: Toshio Banba; Masanori Mizuno; Takaii Mizuno, all of Aichi, Japan

[73] Assignee: Mitsubishi Denki Kabushiki Kaisha, Tokyo, Japan

[21] Appl. No.: 326,993

[22] Filed: Dec. 3, 1981

[30] Foreign Application Priority Data

Dec. 11, 1980 [JP] Japan ............................ 55-177974[U]

[51] Int. Cl.$^3$ ................................................ B23K 9/09
[52] U.S. Cl. ................................................. 219/130.51
[58] Field of Search .................... 219/130.51, 137 PS, 219/130.1

[56] References Cited

FOREIGN PATENT DOCUMENTS 52-73152 6/1977 Japan ............................... 219/130.51

Primary Examiner—C. C. Shaw
Attorney, Agent, or Firm—Sughrue, Mion, Zinn, Macpeak and Seas

[57] ABSTRACT

The inductive elements in the background and pulse current portions of a pulse welding circuit are wound around separate cores and the background current path is connected in series with the pulse current inductive element to prevent damage to the background current switching element due to reverse voltage or current.

9 Claims, 6 Drawing Figures

TRANSISTOR TYPE PULSE WELDING DEVICE

BACKGROUND OF THE INVENTION

This invention relates to an improved transistor type pulse welding device which utilizes a pulse current produced by a transistor.

A pulse welding device having a reactor assembly as shown in FIG. 1 and a circuit as shown in FIG. 3 is known in the art. In FIG. 1, reference numeral 1 designates a reactor coil for pulse current (hereinafter referred to as "an $L_P$"), and 2 a reactor coil for background current (hereinafter referred to as "an $L_B$"). These reactor coils 1 and 2 are wound on one and the same iron core (11 or 12). In FIG. 3, reference numerals 1 and 2 designate the aforementioned $L_P$ and $L_B$, respectively; 3, a DC voltage source; 4, a pulse current switching transistor (hereinafter referred to as "a $TR_P$"); 5, a background current switching transistor (hereinafter referred to as "a $TR_B$"); 6, a circulation diode for pulse current (hereinafter referred to as "a $D_P$"); 7, a circulation diode for background current (hereinafter referred to as "a $D_B$"); and 8, an output terminal.

The operation of the conventional pulse welding device will be described. When only the transistor $TR_B$ is rendered conductive (on), an output current at output terminals 8 is increased while the rate of increase (di/dt) of the output current is being suppressed by the coil $L_B$. When the transistor $TR_B$ is rendered non-conductive (off), a circulation circuit occurs in a path including the diode $D_B$, and accordingly the output current is decreased. When the transistor $TR_P$ is rendered conductive, the output current is increased while the rate of increase is being suppressed by the coil $L_P$. When the transistor $TR_P$ is rendered non-conductive, a circulation circuit occurs in a path including the diode $D_P$, and accordingly the output current is decreased. Thus, an output current waveform as shown in FIG. 5 is obtained by controlling the on-off operations of the transistors $TR_B$ and $TR_P$.

This operation will be described in more detail. When the transistor $TR_P$ is rendered conductive, the current starts to flow to the output terminal through the coil $L_P$. However, since the coils $L_P$ and $L_B$ are wound on one and the same iron core as shown in FIG. 1, an induction voltage proportional to the rate of increase (di/dt) of the current flowing in the coil $L_P$ is induced in the coil $L_B$. Since the induction voltage acts as a voltage source, a circulation current as indicated by the broken line in FIG. 3 tends to flow. This circulation current flows when the collector and emitter of the transistor $TR_B$ exhibit a diode characteristic. Sometimes, if the circulation current is several times as large as the background current, the transistor $TR_B$ will be damaged. If the collector and emitter of the transistor $TR_B$ does not exhibit a diode characteristic, a reverse voltage will be applied across the collector and the emitter. In this case, also, the transistor $TR_B$ may be damaged.

This circulation current problem is caused by the fact that the coils $L_P$ and $L_B$ are wound on one and the same iron core, so that the transistor $TR_B$ is damaged by an excessively large current flowing therein or by a reverse voltage applied thereto.

Furthermore, the circuitry shown in FIG. 3 is disadvantageous in that the switching frequency of the transistor $TR_B$ is usually high, which results in a large switching loss. It is therefore necessary to use a large capacity transistor and to employed an expensive cooling unit.

SUMMARY OF THE INVENTION

An object of this invention is to provide a transistor type pulse welding device in which the above-described magnetic coupling of the coils $L_P$ and $L_B$ is eliminated to protect the background current switching transistor $TR_B$ from damage.

It is a further object of this invention to provide such a device in which the switching frequency of the transistor $TR_B$ is decreased so that a small capacity transistor can be employed and a cooling unit relatively low in cost can be used.

Briefly, this is accomplished by connecting the coils $L_P$ and $L_B$ in series with one another when one of the transistors is conductive. Further, the coils are wound on separate respective cores so that the current flowing in one will not generate an induction voltage in the other, so that no reverse voltage or current will be applied to the transistor $TR_B$ when it is rendered non-conductive.

BRIEF DESCRIPTION OF THE DRAWINGS

The invention will be more clearly understood from the following description in conjunction with the accompanying drawings in which like parts are designated by like reference-numerals or characters, and in which.

DETAILED DESCRIPTION OF THE INVENTION

Figure 1:
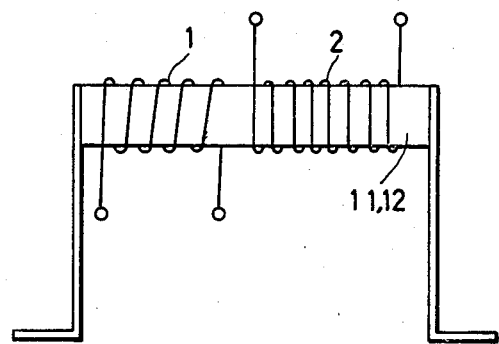
FIG. 1 shows the structure of a conventional reactor coil assembly.
Figure 2:
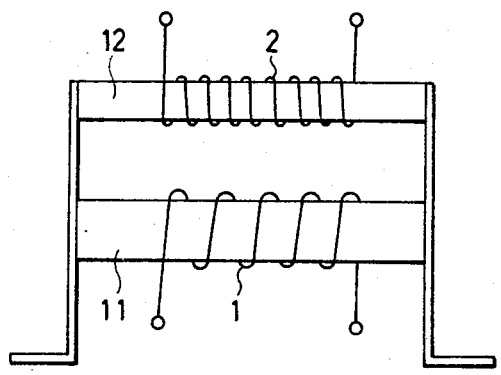
FIG. 2 shows the structure of a reactor coil assembly according to this invention.
Figure 3:
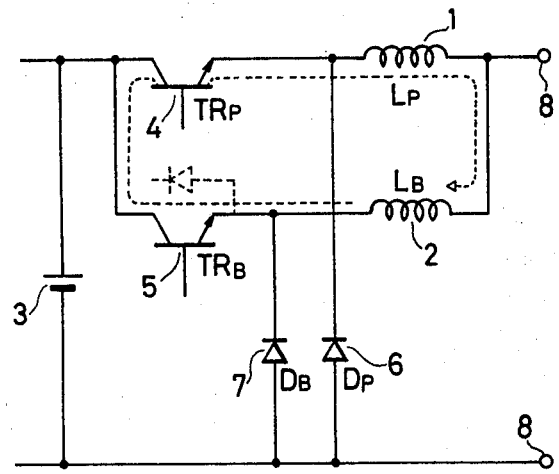
FIG. 3 shows an electrical circuit employed in a conventional transistor type pulse welding device.
Figure 4:
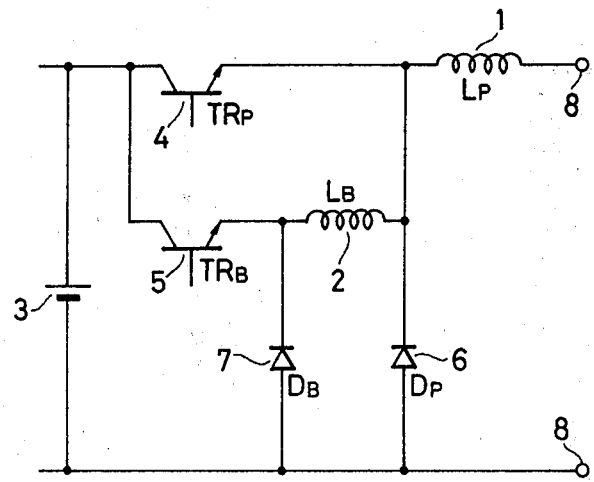
FIG. 4 shows an electrical circuit employed in a transistor type pulse welding device according to this invention.
Figure 5:
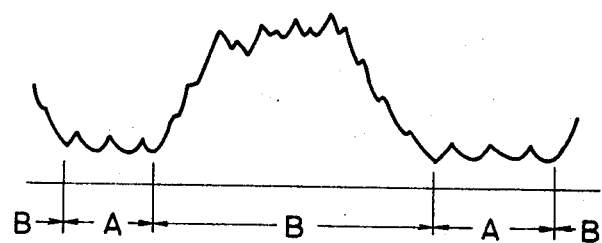
FIG. 5 illustrates the output current waveform characteristics of the circuit of FIG. 3, wherein reference character A designates a period for which only a background current flows, and B designates a period for which the background current and a pulse current superposed thereon flow.
Figure 6:
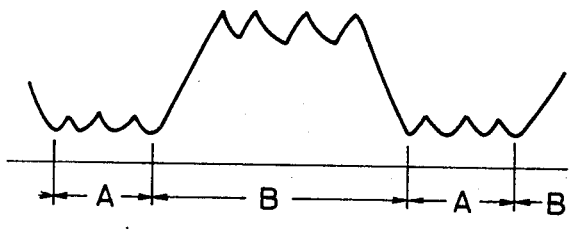
FIG. 6 illustrates the output current waveform characteristics of the circuit of FIG. 4.

Now, one embodiment of the invention will be described with reference to FIGS. 2, 4 and 6. The transistor type pulse welding device of this invention has a coil assembly as shown in FIG. 2 and a circuit as shown in FIG. 4. In FIGS. 2 and 4, those components which have been described with reference to FIGS. 1 and 3 are therefore similarly numbered.

In FIG. 2, reference numeral 1 designates a coil $L_P$ which is wound on its own iron core 11, and 2, a coil $L_B$ which is also wound on its own iron core 12. In FIG. 4, reference numerals 1 and 2 designate the aforementioned coils $L_P$ and $L_B$, respectively; 3, a DC voltage source; 4, a diode $D_B$; and 5, a transistor $TR_B$; 6, a diode $D_P$; 7, a diode $D_B$; and 8, an output terminal. Thus, the circuit shown in FIG. 4 is different from the circuit in FIG. 3 in the connection of the coil $L_B$.

The operation of the embodiment of this invention will now be described. Since the coils $L_P$ and $L_B$ are wound on respective iron cores 11 and 12, they serve as individual reactor coils. When transistor $TR_B$ is rendered conductive, a series circuit of the coils $L_B$ and $L_P$ serves as a reactor coil, and therefore an output current is increased while the rate of current increase is being suppressed by the series reactor coil. When the transistor $TR_B$ is rendered non-conductive, a circulation circuit including the diode $D_B$ is formed, so that the output current is decreased.

When the transistor $TR_P$ is rendered conductive, the output current is increased while the rate of current increase is being suppressed by the coil $L_P$. When the transistor $TR_P$ is rendered non-conductive, a circulation circuit including the diode $D_P$ is formed, so that the output current is decreased. Thus, an output current waveform as shown in FIG. 6 is obtained by controlling the on-off operation of the transistors $TR_B$ and $TR_P$. The circuit in FIG. 4 is different from the circuit in FIG. 3 in the following points. Since the coils $L_P$ and $L_B$ operate as the individual reactor coils, when the transistor $TR_P$ is turned on, no induction voltage is developed in the coil $L_B$. Therefore, the circulation current as indicated by the broken line in FIG. 3 does not flow, and no reverse voltage is applied across the collector and the emitter of the transistor $TR_B$. Accordingly, the transistor $TR_B$ will not be damaged due to such a current.

As is apparent from the above description, according to this invention, the reactor coils $L_B$ and $L_P$ are wound on respective iron cores, and are connected as shown in FIG. 4. Accordingly, the application of an excessively large current to the transistor $TR_B$ and the application of a reverse voltage across the collector and the emitter thereof can be prevented, the switching loss of the transistor can be decreased, the reliability of the transistor can be increased, no protective circuit is needed, a low capacity transistor can be used, and a cooling unit relatively low in cost can be employed.

What is claimed is:

1. A transistor type pulse welding circuit, comprising:
   a DC source;
   an output terminal;
   a first metal core;
   a second metal core separate from said first metal core;
   a first series circuit connected between said source and output terminal, said first series circuit comprising a first switching element and first inductive coil connected in series, said first coil being wound on said first core;
   a second series circuit connected in parallel with at least said first switching element, said second series circuit including a second switching element and a second inductive coil wound on said second core;
   a first diode coupled between said source and a first connection point between said first switching element and first inductive element; and
   a second diode coupled between said source and a second connection point between said second switching element and second inductive element.

2. A transistor type pulse welding circuit as claimed in claim 1, wherein said switching elements comprise transistors.

3. A transistor type pulse welding circuit as claimed in claim 1, wherein said second inductive coil has a first end connected to said second switching element and a second end connected to said first connection point, whereby said second series circuit is connected in parallel with only said first switching element and in series with said first inductive coil.

4. A transistor type pulse welding circuit as claimed in claim 1, wherein said first switching element conducts a pulse current and said second switching element conducts a background current.

5. A transistor type pulse welding circuit, comprising:
   a DC source;
   an output terminal;
   a first series circuit connected between said source and said output terminal, said first series circuit comprising a series connection of a first switching element and first inductive element; and
   a second series circuit connected in parallel with said first switching element, said second series circuit comprising a second switching element coupled to one end of a second inductive element the other end of which is coupled to a first connection point between said first switching element and first inductive element.

6. A transistor type pulse welding circuit as claimed in claim 5, further comprising:
   a first diode coupled between said source and said first connection point; and
   a second diode coupled between said source and a second connection point between said second switching element and second inductive element.

7. A transistor type pulse welding circuit as claimed in claim 6, wherein said first and second inductive elements are coils.

8. A transistor type pulse welding circuit as claimed in claim 7, wherein said first and second switching elements comprise transistors.

9. A transistor type pulse welding circuit as claimed in claim 8, wherein said first switching element conducts a pulse current when turned on and said second switching element conducts a background current when turned on.

* * * * *